(12) United States Patent
Faihe

(10) Patent No.: US 8,776,127 B2
(45) Date of Patent: Jul. 8, 2014

(54) METHOD OF TELEVISION PROGRAM SUGGESTION AND APPARATUS THEREFOR

(75) Inventor: Yassine Faihe, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1428 days.

(21) Appl. No.: 10/262,383

(22) Filed: Oct. 1, 2002

(65) Prior Publication Data

US 2003/0135855 A1 Jul. 17, 2003

(30) Foreign Application Priority Data

Oct. 4, 2001 (EP) .................................... 01203768

(51) Int. Cl.
*G06F 3/00* (2006.01)
(52) U.S. Cl.
USPC .................... 725/46; 725/47; 725/43; 725/61

(58) Field of Classification Search
USPC .......................................... 725/39, 45, 46, 47
See application file for complete search history.

(56) References Cited

U.S. PATENT DOCUMENTS

| 6,177,931 B1 * | 1/2001 | Alexander et al. ............... 725/52 |
| 7,174,512 B2 * | 2/2007 | Martin et al. .................. 715/719 |
| 2002/0170057 A1 * | 11/2002 | Barrett et al. ................... 725/41 |
| 2003/0079227 A1 * | 4/2003 | Knowles et al. ................ 725/50 |

\* cited by examiner

*Primary Examiner* — Jun Fei Zhong

(57) ABSTRACT

A method and apparatus provide a television viewer with relevant program suggestions while the viewer browses an electronic program guide (EPG). A viewer profile is used in conjunction with the viewer's usage of the EPG as a basis for program suggestions. In this way, relevant program suggestions may be provided, and optionally displayed within a picture-in-picture window on the screen of a television.

9 Claims, 5 Drawing Sheets

METHOD OF TELEVISION PROGRAM SUGGESTION AND APPARATUS THEREFOR

The present invention relates to a method of television program suggestion and an apparatus for carrying out the method, the method relating particularly to a method of television program suggestion based on a viewer's usage of an electronic program guide (EPG).

As the number of television channels available to viewers increases, it becomes increasingly difficult for a viewer to find programs of interest. EPGs can help to overcome this problem by displaying upcoming programs grouped according to particular genres, channels, time slots etc. A number of more sophisticated methods of television program suggestion are known and generally display suggestions to viewers through an EPG, with suggestions based on a viewer profile. The viewer profile contains information relating to a viewer's interests and may be generated according to interest information obtained either explicitly by a viewer entering preferences, or implicitly from aspects of viewer behavior.

The patent document WO 00/04708 discloses a method of television program suggestion using information relating to a program a viewer is currently watching to make the suggestions. This can be described as a context-sensitive suggestion method, the context for the suggestions being given by information relating to the currently watched program.

Methods of television program suggestion using information relating to the program a viewer is currently watching are necessarily limited to suggesting program in some way related to the currently watched program, i.e. the current context, but a viewer may require program suggestions if the currently watched program is not relevant to the viewer's interests. Limiting to suggestions based on the current program may provide a too narrow range of program suggestions.

It is an object of preferred embodiments of the present invention to provide a method of television program suggestion based on a viewer's usage of an EPG which provides context-sensitive suggestions of programs without the limitations described above.

According to a first aspect of the invention, there is provided a method of television program suggestion, which method is characterized in that the program suggestions provided are based on a profile of the viewer's interests and a viewer's current location in an EPG structure.

Supplying context-based suggestions rather than simply suggestions based on viewer profile alone ensures that a more focussed suggestion can be given, which is more likely to meet with the viewer's actual viewing preferences at that time.

Preferably, program choices which are directly accessible from the current location and closely correlate with viewer preferences from the profile are suggested to the viewer.

Suitably, a first suggestion provided to the viewer is a program choice from the current location having a closest correlation with the viewer preferences.

The viewer's current location in an EPG structure may comprise:
(i) an information location relating to a particular channel, in which case program suggestions are provided on a priority basis from this channel;
(ii) an information location relating to a particular time slot, in which case program suggestions are provided on a priority basis from this time slot;
(iii) an information location relating to a particular program genre, in which case program suggestions are provided on a priority basis from this program genre or a sub set of this program genre; or any other suitable information location.

Suitably, the program suggestions provided are updated whenever a viewer's location in an EPG structure changes.

Suitably, the program suggestions provided are displayed in a picture-in-picture window specifically for displaying program suggestions. However, the program suggestions may be displayed by highlighting relevant programs in an existing EPG window. If no relevant programs can be identified, no suggestions are displayed.

According to a second aspect of the invention, there is provided an apparatus for carrying out the method of the first aspect of the invention, said apparatus comprising an EPG; an interface to enable a viewer to change locations in the EPG; a stored profile of viewer preferences; a receiver to receive signals including television programs and information relating to television programs; and means for providing program suggestions based on the viewer's current location in the EPG and the preferences in the stored profile.

Preferably, the EPG stores the information relating to television programs and provides the information relating to television programs to the means for providing program suggestions.

According to a third aspect of the invention, there is provided a television display apparatus incorporating the apparatus of the second aspect and a display capable of displaying the received signals, information from the EPG and provided program suggestions.

For a better understanding of the invention, and to show how embodiments of the same may be carried into effect, reference will now be made, by way of example, to the accompanying diagrammatic drawings in which.

Figure 1:
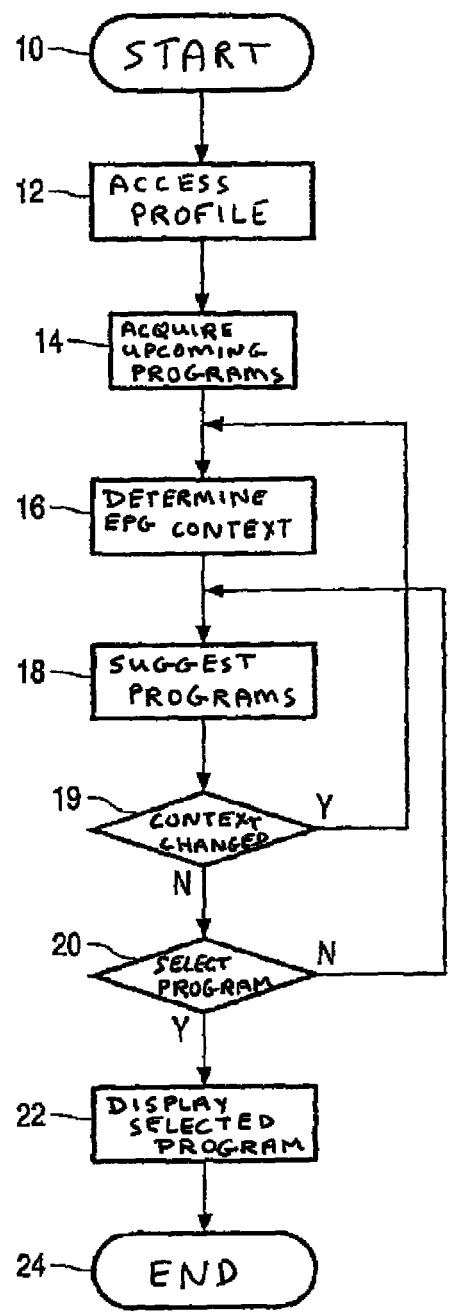
FIG. 1 shows a flow chart illustrating a method according to the present invention.

Illustrative steps involved in providing a method of television program suggestion according to the present invention are shown in FIG. 1. Upon entering an EPG structure and a context-based program suggestion function, the procedure of FIG. 1 is initiated, in step 10. At any point after this, the process may be terminated by a jump directly to step 24 by exiting the context-based program suggestion function. Step 12 involves the accessing of a viewer profile. The viewer profile may be stored locally to the equipment carrying out the method, or may be alternatively provided from a remote database. After the viewer profile has been accessed, knowledge regarding the content of upcoming programs is acquired in step 14. The metadata is broadcast along with the EPG signals. Next, the EPG context is determined in step 16. The EPG context comprises a location in an EPG structure that a viewer is currently browsing. For example, the viewer may browse through programs being shown at a particular time, programs being shown on a particular channel or by particular types of channels (for example, music channels, sports channels, movie channels, etc). In step 18, the viewer profile, EPG context and knowledge of forthcoming programs are used to provide relevant program suggestions to a viewer. In this step, the EPG context is correlated with viewer profile so as to present and display suggestions which are targeted toward a close correlation between the context and the profile. In step 19, it is determined if the context has changed. If the context has not changed, the method proceeds to step 20, otherwise the process returns to step 16. In step 20, if one of the suggested programs is selected, the method proceeds to step 22 where that selected program is displayed and then to step 24 where the process ends. In step 20, if no program is judged to have been selected, the process returns to step 18.

Figure 2:
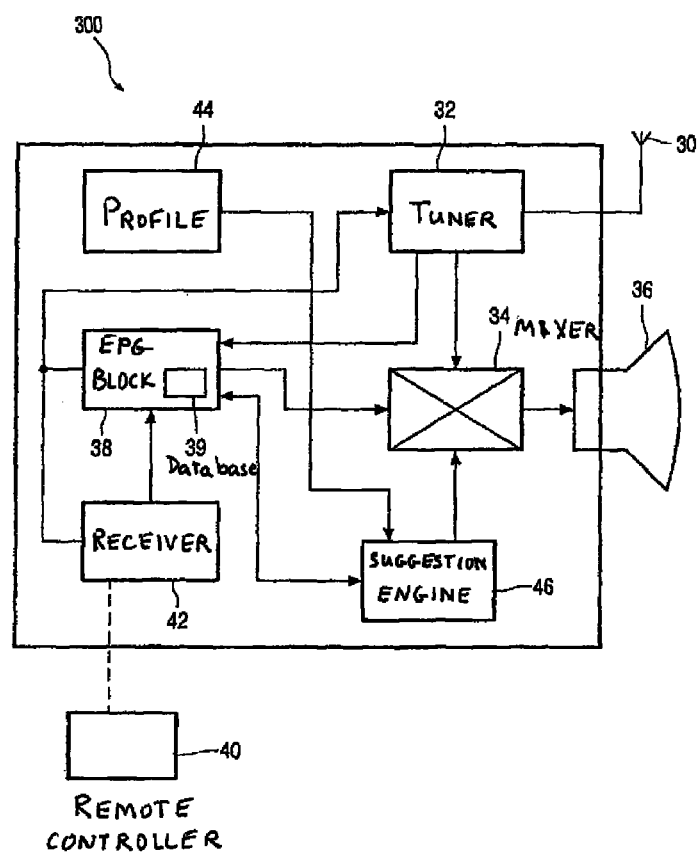
FIG. 2 shows a television display apparatus incorporating apparatus for carrying out the method of the present invention.

FIG. 2 shows an example of an embodiment for carrying out the present invention. The apparatus shown in FIG. 2 comprises a television display apparatus 300. A television broadcast signal is received by the television display apparatus 300 at aerial 30. The television broadcast signal may comprise a digital or analog signal, and may be broadcast by terrestrial, satellite, cable or other suitable techniques. The signal received at aerial 30 is fed to the demodulation/tuner block 32. The demodulation/tuner block 32 feeds a video signal to a video mixer 34. The video signal output by the demodulation/tuner block 32 comprises a particular television channel. The video mixer 34 is directly coupled to an optical output device 36, which may be, for example, a cathode ray tube or any other suitable apparatus.

The demodulation/tuner block 32 extracts EPG information included in the broadcast signal and feeds this information to EPG block 38. The EPG information fed to EPG block 38 comprises both information on forthcoming programs in a video format to be fed to video mixer 34 before display on optical output device 36 when a viewer is using an EPG function, but also metadata concerning forthcoming TV programs that can be fed to a suggestion engine 46 when the viewer requires context-based program suggestions. The metadata is stored in an EPG database 39 after its extraction from the television broadcast signal. In the television display apparatus 300 of FIG. 2, a user profile is stored in profile block 44, but the user profile may be alternatively stored remotely. The information contained in profile block 44 may be acquired through any suitable technique, such as explicit feedback from a viewer's response to a questionnaire, by a user selecting a lifestyle stereotype or by any form of implicit feedback from viewer activity statistics.

A viewer controls the operation of the television display apparatus 300 by using a remote control unit 40. The remote control unit produces infrared signals when operated by a viewer, although other control devices can be envisaged by persons skilled in the art. The infrared signals from the remote control unit 40 are received by an infrared receiver 42. The infrared receiver 42 passes control signals to the demodulation/tuner block 32 to control the TV channel fed to the display apparatus 36 through the mixer 34. In addition, the infrared receiver 42 feeds control signals to EPG block 38 to control the viewer's operation of the EPG. The EPG block 38 feeds a first signal to the video mixer 34 for incorporation in the video signal displayed at optical output device 36. The viewer may also initiate a change of channel whilst using the EPG, and therefore a second output of EPG block 38 is fed to the control input of the demodulation/tuner block 32.

If the viewer using the EPG initiates a context-based suggestion function according to the present invention, the EPG block 38 feeds this request to suggestion engine 46.

The suggestion engine 46 accesses profile block 44 to acquire the viewer profile and also accesses the EPG database 39 of EPG block 38 to acquire metadata regarding forthcoming programs. On receiving these pieces of information, the suggestion engine 46 outputs a video signal containing the context-based suggestions to the video mixer 34 for incorporation in the signal supplied by the video mixer 34 to the optical output device 36. The output of the suggestion engine may be mixed into a separate picture-in-picture window, or may be alternatively mixed into an existing EPG picture-in-picture window.

The viewer may accept one of the program suggestions and navigates through the EPG structure using the remote control unit 40 to signal this acceptance. In this case, the EPG block 38 feeds a signal from its second output to the control input of the demodulation/tuner block 32. The demodulation/tuner block 32 tunes to the desired television channel and sends the relevant video information to the video mixer 34 for display on optical output device 36.

Alternatively, the viewer may continue browsing through the EPG structure in an attempt to locate more relevant programs. In this case, as the viewer navigates through the EPG structure, the EPG context changes and the suggestion engine 46 provides new suggestions.

Alternatively, the viewer may at any point exit the context-based suggestion function without selecting a suggested program, and operate the television display apparatus 300 in different ways.

Figure 3A:
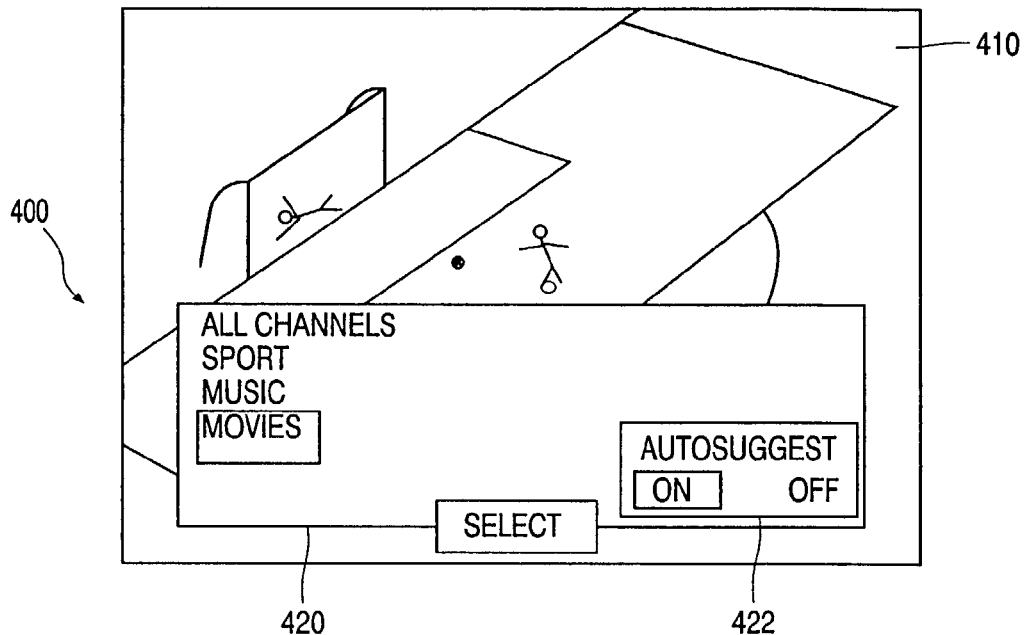
FIGS. 3A-3E show examples of screen displays provided to a viewer using an EPG featuring a program suggestion function according to the present invention.
Figure 3B:
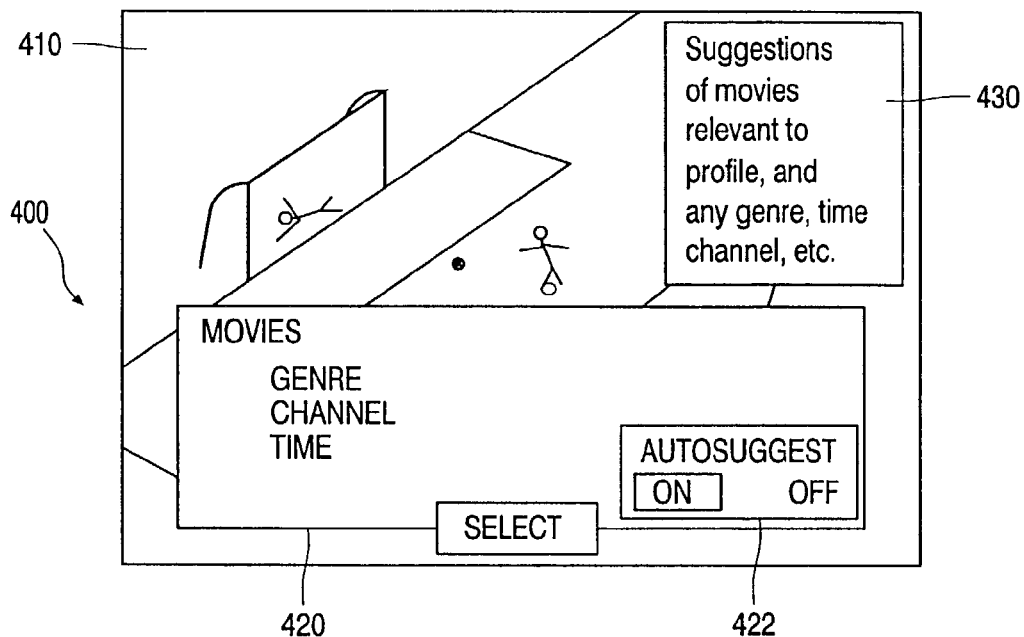
Figure 3C:
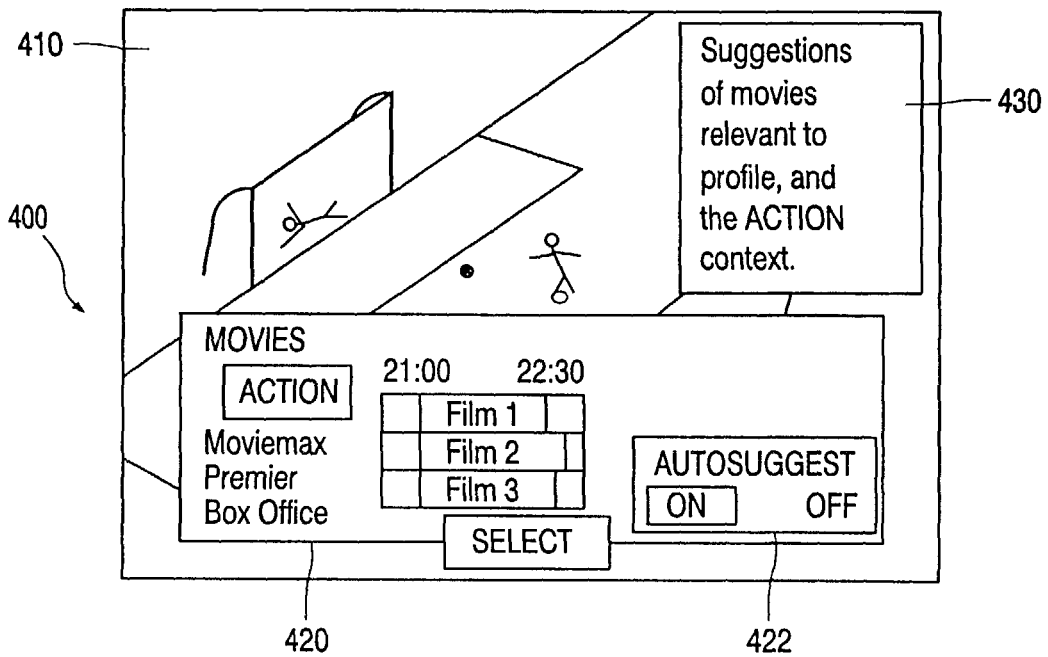

Examples of the type of screen displays presented to the viewer using the context-based suggestion function of the television display apparatus 300 are shown in FIGS. 3A-3E. The output of the optical output device 36 appears at screen 400. Screen 400 shows television program content 410, and, as shown in FIG. 3A, a picture-in-picture window 420 displaying EPG information. As can be seen in FIG. 3A, the EPG information displayed in picture-in-picture window 420 provides, within box 422, the viewer with an option of entering the context-based program suggestion function. If the viewer activates the context-based program suggestion function and chooses to browse the EPG for, e.g. movies, an example of the type of output at screen 400 which might be displayed is given in FIG. 3B. Together with the television program 410 and the EPG information window 420, a new picture-in-picture window 430 containing program suggestions is displayed. The user's current EPG context is "movies", so the suggestions provided in window 430 are based on the viewer profile, and the fact that the viewer is currently looking for movies. The suggestions are therefore not restricted to movies of a particular genre, nor a particular channel etc. unless these limitations are included in the profile. If the viewer then chooses to browse for movies of a particular genre such as, e.g. action movies, an example of the type of screen displayed is given in FIG. 3C. Here, as the viewer's context relates to action movies, the programs suggested and displayed in window 430 are based on both the viewer profile and this new context.

Figure 3D:
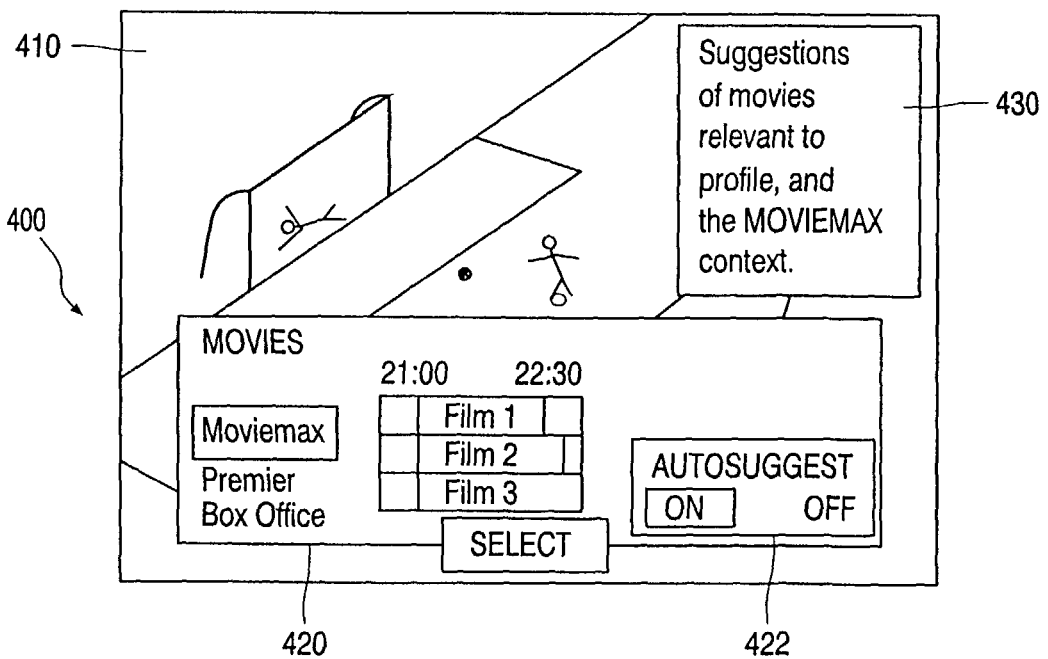

Alternatively, the user may wish to browse for movies on a particularly favored channel. In this case, the type of output at screen 400 is shown in FIG. 3D where the suggestions provided in the window 430 relate to movies on the channel being browsed rather than any particular genre.

Figure 3E:
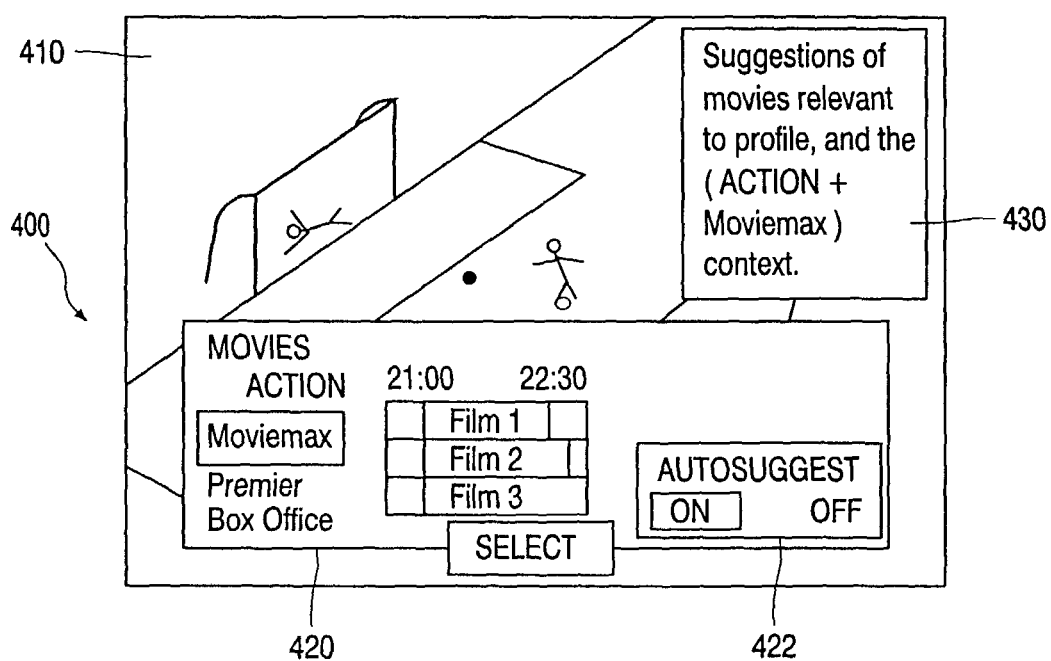

Alternatively, as shown in FIG. 3E, the viewer may wish to browse movies on a particular channel that also fall within a specific genre, and in this case the suggestions provided in window 430 relate both to the genre and channel of interest.

The suggestion engine essentially assesses the correlation between the metadata relating to programs falling within the currently browsed context of the EPG and the known viewer profile and presents suggestions based on the highest correlations. If, however, there is only a low correlation between such metadata of the currently browsed context and the known viewer profile, no suggestion is made. A threshold level of correlation may be preset within the apparatus such that, when suggestions which are context-based receive correlation levels below that threshold, no suggestions are presented.

To select a suggested program, the viewer activates the window 430 and once browsing within the window 430, selects a suggestion in the normal way.

Thus, it has been shown how embodiments of the present invention may provide a wide range of relevant program suggestions to a viewer. The present invention avoids suggesting programs only relevant to a viewer profile and thereby always repeating the same suggestions.

It will be appreciated by the person skilled in the art that numerous variations may be made which are still within the scope of the present invention, the scope of the present invention being limited only by the accompanying claims.

The invention claimed is:

1. A method of television program suggestion comprising the acts of:
   displaying a current television program on a display, the current television program being displayed on an entire display area of the display;
   displaying a user selectable suggestion mode option indicating whether a context-based program suggestion function is activated or deactivated;
   activating the context-based program suggestion function by a user;
   in response to the activating act, accessing a profile of a viewer and an electronic program guide (EPG) by a suggestion engine, outputting by the suggestion engine a signal containing program suggestions, and displaying the program suggestions on the display, the program suggestions being for television programs included in the EPG based on the profile and usage by the viewer of the EPG including a current location of the viewer in the EPG;
   displaying a first picture-in-picture window on the display including information from the EPG and the suggestion mode option indicating that the context-based program suggestion function is activated;
   browsing the information from the EPG displayed in the first picture-in-picture window;
   in response to the activating act and the browsing act, displaying a second picture-in-picture window on the display including information about the program suggestions, wherein the current television program remains on the entire display area of the display, and the first and second picture-in-picture windows are overlaid on the current television program and do not contact each other leaving gaps between the first and second picture-in-picture windows, and wherein the current television program that remains on the entire display area of the display with the first second picture-in-picture windows are overlaid thereon is visible through the gaps.

2. The method of claim 1, wherein program choices which are directly accessible from the current location and closely correlate with the viewer preferences from the profile are suggested to the viewer.

3. The method of claim 2, wherein a first suggestion provided to the viewer is a program choice from the current location having a closest correlation with the viewer preferences.

4. The method of claim 1, wherein the current location in the EPG comprises:
   (i) an information location relating to a particular channel, in which case program suggestions are provided on a priority basis from the particular channel; or
   (ii) an information location relating to a particular time slot, in which case program suggestions are provided on a priority basis from the particular time slot; or
   (iii) an information location relating to as particular program genre, in which case program suggestions are provided on a priority basis from the particular program genre or a sub set of the particular program genre.

5. The method of claim 1, wherein the act of displaying the program suggestions displays the program suggestions in a picture-in-picture window.

6. The method of claim 1, further comprising the act of updating the program suggestions and displaying the updated program suggestions in the second picture-in-picture window on the display whenever the current location in the EPG changes.

7. An apparatus comprising:
   a display configured to display a current television program on the display, the current television program being displayed on an entire display area of the display;
   an electronic program guide (EPG) included in an EPG block;
   an interface to enable a viewer to change locations in the EPG;
   a stored profile of viewer preferences stored in a memory;
   a receiver to receive signals including television programs and information relating to television programs; and
   a suggestion engine configured to provide program suggestions for television programs included in the EPG based on usage by the viewer of the EPG including a current location of the viewer in the EPG and the viewer preferences in the stored profile, the suggestion engine being connected to the EPG block and the memory,
   wherein the suggestion engine is further configured to:
   display a user selectable suggestion mode option indicating whether a context-based program suggestion function is activated or deactivated;
   provide the program suggestions in response to activation by a user of the context-based program suggestion function by accessing the stored profile and the EPG, and outputting a signal containing the program suggestions,
   display a first picture-in-picture window including information from the EPG and the suggestion mode option indicating that the context-based program suggestion function is activated, and
   display a second picture-in-picture window the display including information about the program suggestions, wherein the second picture-in-picture window is displayed in response to activating the context-based program suggestion function and browsing the EPG; and wherein the current television program remains on the entire display area of the display, and the first and second picture-in-picture windows are overlaid on the current television program and do not contact each other leaving gaps between the first and second picture-in-picture windows, and wherein the current television program that remains on the entire display area of the display with the first and second picture-in-picture windows are overlaid thereon is visible through the gaps.

8. The apparatus of claim 7, wherein the EPG stores the information relating to the television programs and provides the information relating to the television programs to the suggestion engine.

9. The apparatus of claim 7, wherein the suggestion engine is further configured to update the program suggestions and display the updated program suggestions in the second picture-in-picture window on the display whenever the current location in the EPG changes.

* * * * *